(12) United States Patent
Perzy et al.

(10) Patent No.: US 7,961,667 B2
(45) Date of Patent: Jun. 14, 2011

(54) AD-HOC GROUPS IN SIP/SIMPLE

(75) Inventors: Gil Perzy, Holon (IL); Gili Revel, Rehovot (IL); Galina Rubinshtein, Holon (IL); Uri Segev, Or-Yehuda (IL); Ofira Tal, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 1362 days.

(21) Appl. No.: 11/459,038

(22) Filed: Jul. 21, 2006

(65) Prior Publication Data

US 2008/0019300 A1    Jan. 24, 2008

(51) Int. Cl.
*H04W 4/00* (2009.01)
(52) U.S. Cl. ......... 370/328; 370/329; 455/518; 455/519
(58) Field of Classification Search .................. 370/328, 370/329; 455/518, 519
See application file for complete search history.

(56) References Cited

U.S. PATENT DOCUMENTS

| | | | |
|---|---|---|---|
| 2005/0164727 A1* | 7/2005 | Hasegawa | 455/519 |
| 2005/0186970 A1* | 8/2005 | Yates et al. | 455/456.5 |
| 2005/0267936 A1* | 12/2005 | Poikselka | 709/204 |
| 2005/0278358 A1* | 12/2005 | Doughan | 707/100 |
| 2006/0190402 A1* | 8/2006 | Patron et al. | 705/51 |
| 2007/0081644 A1* | 4/2007 | Jachner | 379/106.01 |

FOREIGN PATENT DOCUMENTS

WO    WO2005086521 A1    9/2005

* cited by examiner

*Primary Examiner* — Patrick N Edouard
*Assistant Examiner* — Justin Y Lee
(74) *Attorney, Agent, or Firm* — Raymond Szeto; Hoffman Warnick LLC

(57) ABSTRACT

A method for ad-hoc group presence management, the method including configuring a presence server to receive information regarding a group and entities belonging to the group and create a group presentity associated with the group, and providing information regarding a group and its entities to the presence server, thereby causing the presence server to create the group presentity.

13 Claims, 3 Drawing Sheets

AD-HOC GROUPS IN SIP/SIMPLE

FIELD OF THE INVENTION

The present invention relates in general to group entity management in computer networking environments, and more particularly to implementing ad-hoc group presentities in a SIP/SIMPLE environment.

BACKGROUND OF THE INVENTION

The Session Initiation Protocol (SIP), together with extensions defined by the SIP Instant Messaging and Presence Leveraging Extensions (SIMPLE), provides for the implementation of presence servers which receive and maintain presence information regarding entities called "presentities," such as computer or cell phone users, and provide presence information to subscribers who request presentity presence information.

Extensions to SIP/SIMPLE have been proposed for accommodating group presentities, such as a "customer service" presentity whose presence information includes the names and email addresses of currently-available customer service representatives. However, such extensions require that the group presence information be maintained using an external application. For example, where an ad-hoc group is formed, such as for a conference call that is managed by a conference server, and a group presentity for the conference is created on a presence server, the comings and goings of group participants to and from the conference call currently requires each participant to separately update both the conference server as well as the presence server. A mechanism for managing ad-hoc group presence information that reduces participant-side management responsibility would therefore be desirable.

SUMMARY OF THE INVENTION

The present invention discloses a system and method for implementing ad-hoc group presentities in a SIP/SIMPLE environment.

In one aspect of the present invention a method is provided for ad-hoc group presence management, the method including configuring a presence server to receive information regarding a group and entities belonging to the group and create a group presentity associated with the group, and providing information regarding the group and its entities to the presence server, thereby causing the presence server to create the group presentity.

In another aspect of the present invention a system is provided for ad-hoc group presence management, the system including a presence server configured to receive information regarding a group and entities belonging to the group and create a group presentity associated with the group, and means for providing information regarding the group and its entities to the presence server, thereby causing the presence server to create the group presentity.

In another aspect of the present invention a computer-implemented program is provided embodied on a computer-readable medium, the computer-implemented program including a first code segment operative to receive information regarding a group and entities belonging to the group and create a group presentity associated with the group, and a second code segment operative to provide information regarding the group and its entities to the presence server, thereby causing the first code segment to create the group presentity.

BRIEF DESCRIPTION OF THE DRAWINGS

The present invention will be understood and appreciated more fully from the following detailed description taken in conjunction with the appended drawings.

DETAILED DESCRIPTION OF THE INVENTION

Figure 1:
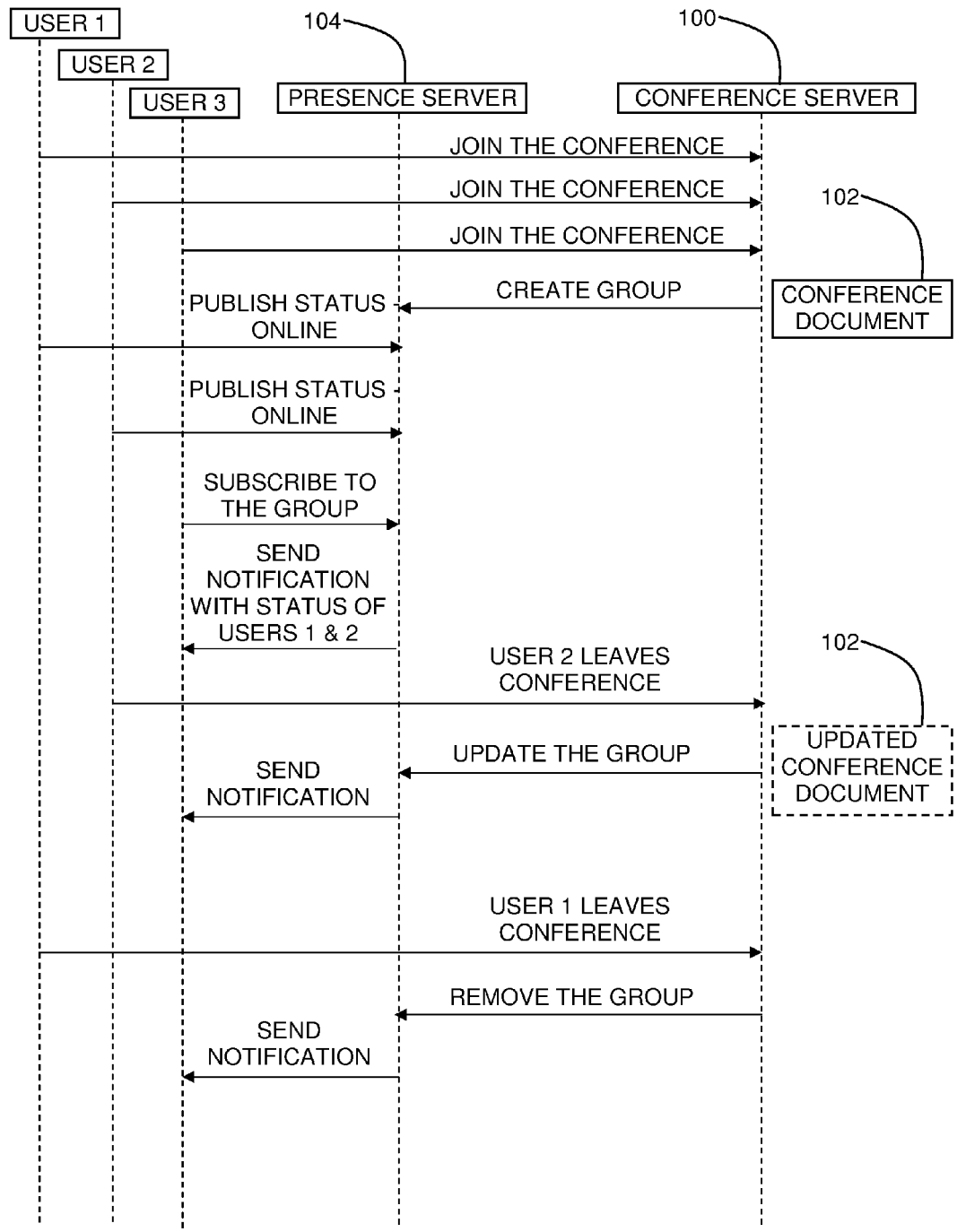
FIG. 1 is a simplified conceptual illustration of a system for ad-hoc group presence management, constructed and operative in accordance with an embodiment of the present invention.

Reference is now made to FIG. 1, which is a simplified flow diagram of a system for ad-hoc group presence management, constructed and operative in accordance with a preferred embodiment of the present invention. While the present invention is described herein by way of example with respect to participants in a conference, it is appreciated that the present invention is applicable with respect to any type of group of entities, with the term "conference" being interchangeable with the term "group," and the terms "participant" and "user" being interchangeable with the term "entity" and referring to any entity that may belong to a group and for which presence information may be maintained by a presence server.

In the system of FIG. 1 one or more participants (i.e., entities), shown by way of example as users 1, 2, and 3, join a conference (i.e., group), such as a telephone conference, that is managed by a conference server 100 (i.e., group management server), such as a computer server running IBM™ Workplace™ software. Conference server 100 is preferably configured as is now described. Conference server 100 preferably creates and maintains a conference document 102, which may be in Extensible Markup Language (XML) format, and which describes the conference, typically including a listing of the potential and/or currently active participants in the conference.

Periodically, such as when conference document 102 is first created and thereafter at fixed time intervals, and/or each time conference document 102 is updated by conference server 100, such as to reflect that a participant has joined or left the conference, conference server 100 sends conference document 102 to a presence server 104, such as a computer server running IBM™ Websphere™ Presence Server software, configured to receive and process conference information as follows.

When presence server 104 first receives conference document 102 it creates a group presentity associated with the conference, deriving the conference participant information from within conference document 102, such as by using one or more XPATH statements contained within a header of conference document 102 and indicating the location of the listing with conference document 102. Users 1, 2, and 3 may then publish their presence information to presence server 104, as do users 1 and 2 in the example shown in FIG. 1, which presence information presence server 104 maintains. Users 1, 2, and 3 may also send to presence server 104 a subscription request to the conference group presentity, as does user 3 in the example shown. Presence server 104 may send notifications to subscribers to the conference group presentity indicating the published presence information of participants in the conference that are known to presence server 104, as presence server 104 sends to subscribed user 3 in the example shown.

When participants signal to conference server 100 that they are leaving the conference, as do users 1 and 2 in the example shown, conference server 100 preferably updates conference document 102 to reflect the fact that participants have left the conference, and sends the updated conference document 102 to presence server 104. Presence server 104 preferably removes from the conference group presentity any participants that have left the conference as indicated by the updated conference document 102, and any subsequent notifications to subscribers will reflect this fact. Thus, after user 2 leaves the conference, any subsequent notification sent by presence server 104 regarding the conference group presentity will no longer indicate presence information for user 2. Likewise, presence server 104 preferably adds to the conference group presentity any participants that have joined the conference as indicated by an updated conference document 102. If the conference ends, such as where conference server 100 terminates the conference after user 1, being the last participant, leaves the conference, conference server 100 preferably updates conference document 102 to reflect this and sends the updated conference document 102 to presence server 104, whereupon presence server 104 preferably removes the conference group presentity.

In addition to, or in place of, conference server 100 sending conference document 102 and updates thereof to presence server 104 to reflect the start and end of a conference and the comings and goings of conference participants, conference server 100 may use an API (Application Program Interface) to instruct presence server 104 to create, delete, and/or update the corresponding conference group presentity.

Figure 2:
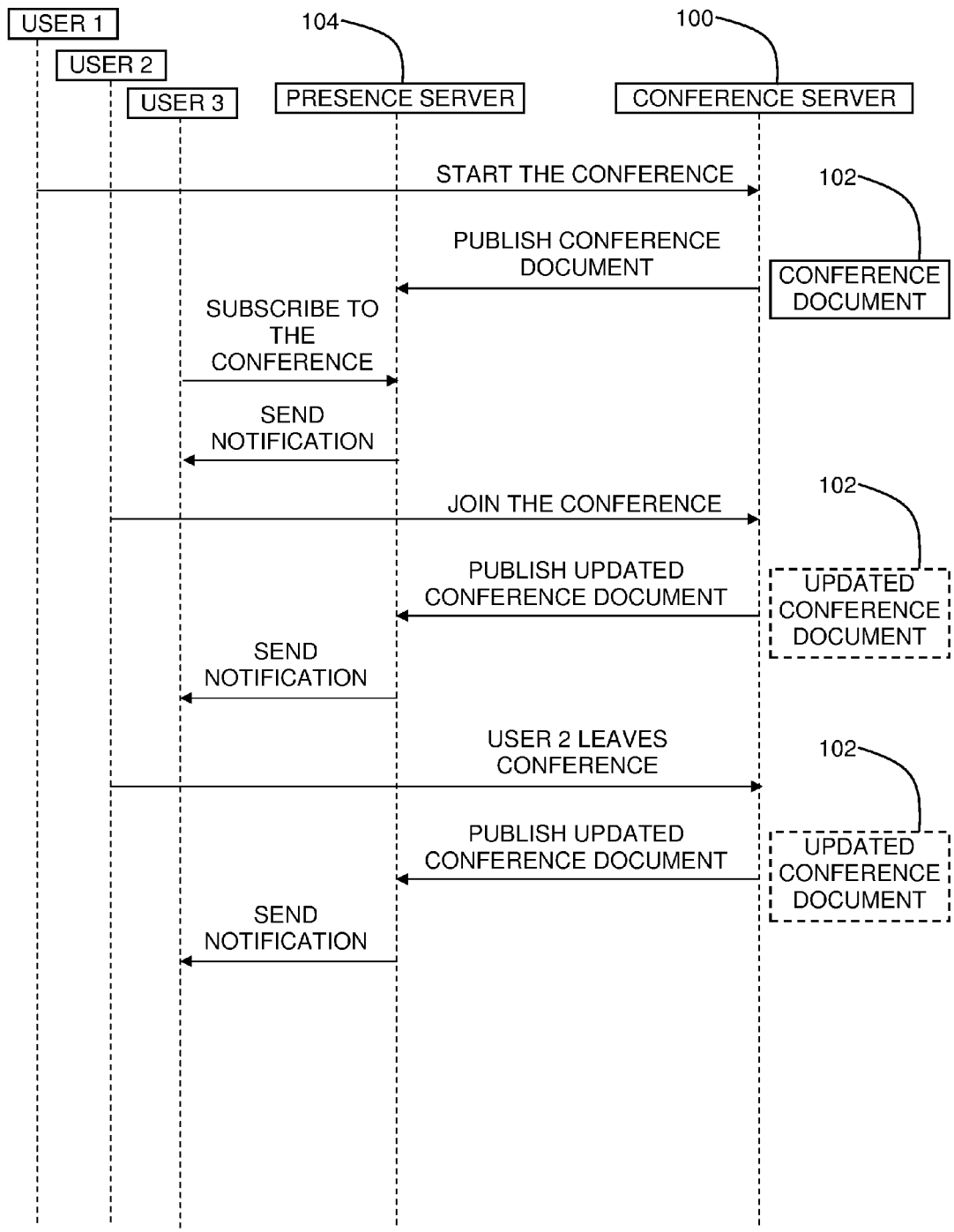
FIG. 2 is a simplified conceptual illustration of an alternative system for ad-hoc group presence management, constructed and operative in accordance with a preferred embodiment of the present invention.

Reference is now made to FIG. 2, which is a simplified flow diagram of an alternative system for ad-hoc group presence management, constructed and operative in accordance with a preferred embodiment of the present invention. The system of FIG. 2 is substantially similar to the system of FIG. 1, with the notable exception that instead of conference document 102 including instructions concerning the extraction of participant information from within conference document 102, subscribers may themselves provide such instructions to presence server 104.

Each subscriber may provide different instructions indicating which participant information to extract from conference document 102, thus enabling presence server 104 to send different notifications to different subscribers, each notification including presence information for different participants. As before, the instructions may be in the form of XPATH statements. As conference document 102 is updated, the extractions are performed on the document anew based on the individual subscription parameters.

Figure 3:
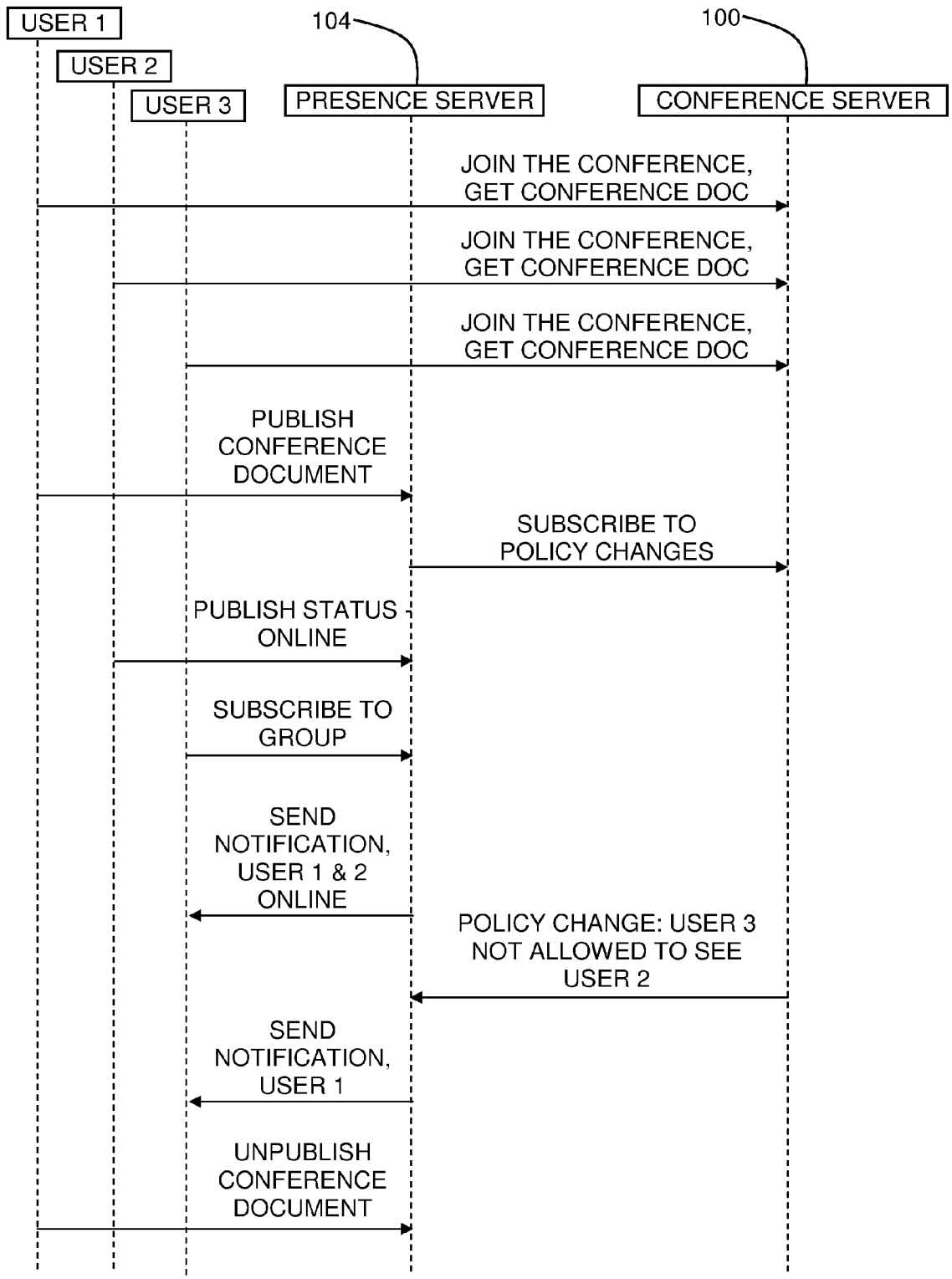
FIG. 3 is a simplified conceptual illustration of a policy-based system for ad-hoc group presence management, constructed and operative in accordance with a preferred embodiment of the present invention.

Reference is now made to FIG. 3, which is a simplified flow diagram of a policy-based system for ad-hoc group presence management, constructed and operative in accordance with a preferred embodiment of the present invention. The system of FIG. 3 is substantially similar to the system of FIG. 1, with the notable exception that presence server 104 may receive policy information from conference server 100, such as by subscribing for policy information and updates, which policy information presence server 104 uses when determining what presence information to include in notifications to subscribers to the conference group presentity. In one example, conference server 100 provides presence server 104 with a policy directive indicating that user 3 is not allowed to see that user 2 is participating in the conference.

FIG. 3 also illustrates that conference document 102 may be provided by conference server 100 to users who join the conference, whereupon any of the users may publish conference document 102 to presence server 104 together with information regarding how to extract the conference participant information group from the document.

It will be appreciated that different features of the invention that are described hereinabove with reference to FIGS. 1, 2, and 3 may be combined in ways not specifically shown. For example, all non-mutually-exclusive combinations of the following options are anticipated:

a) the presence server creates a conference group presentity based on:
   receiving the conference document from the conference server;
   receiving the conference document from a participant;
   receiving an API instruction from the conference server;
b) conference participant information comes from:
   the conference document, as extracted by the presence server;
   the conference server, as communicated to the presence server via an API;
c) participant extraction instructions come from:
   the conference server via an API;
   the conference server via the conference document itself;
   a participant;
d) conference document updates may be sent to the presence server for reextracting updated participant information;
e) the conference server may provide policy directives to the presence server.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques. Further, the steps of the present invention can be provided as a computer-implemented program embodied on a computer-readable medium.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for ad-hoc group presence management, the method comprising:
   configuring a presence server in a Session Initiation Protocol (SIP)/SIP Instant Messaging and Presence Leveraging Extensions (SIMPLE) environment to receive a group document regarding a group and entities belonging to the group and create a group presentity associated with the group, wherein the group document is in an Extensible Markup Language (XML) format; and
   providing the group document regarding the group and its entities to the presence server, the presence server using at least one XPATH statement contained in a header of the group document to extract the entities belonging to the group to create the group presentity;

wherein the configuring step comprises configuring the presence server to send different notifications to different subscribers to the group presentity, each notification including presence information for different subsets of the entities, and comprises configuring the presence server to receive a policy information from a group management server which manages the group.

2. The method according to claim 1, further comprising:
configuring a group management server to create the group document associated with the group and including information regarding the group's entities; and
providing the group document to the presence server.

3. The method according to claim 2, further comprising configuring the group management server to periodically update the group document to reflect that any of the entities has joined or left the group and provide the updated group document to the presence server.

4. The method according to claim 1, further comprising configuring the group management server to notify the presence server using an API that the group has started or ended.

5. The method according to claim 1, further comprising configuring the group management server to periodically update the presence server using an API to reflect that any of the entities has joined or left the group.

6. The method according to claim 1, wherein the configuring step comprises configuring the presence server to receive a publication of presence information relating to any of the entities, receive a subscription request to the group presentity, and send a notification to a subscriber indicating the published presence information of any of the entities in the group as known to the presence server.

7. The method according to claim 1, wherein the configuring step comprises configuring the presence server to remove from the group presentity any entities that leave the group, and add to the group presentity any entities that join the group.

8. The method according to claim 1, wherein the configuring step comprises configuring the presence server to determine what presence information to include in a notification to a subscriber to the group presentity in accordance with a policy.

9. A system for ad-hoc group presence management, the system comprising:

a presence server in a Session Initiation Protocol (SIP)/SIP Instant Messaging and Presence Leveraging Extensions (SIMPLE) environment configured to receive a group document regarding a group and entities belonging to the group and create a group presentity associated with the group, wherein the group document is in an Extensible Markup Language (XML) format; and a system for providing the group document regarding the group and its entities to the presence server, the presence server using at least one XPATH statement contained in a header of the group document to extract the entities belonging to the group to create the group presentity;

wherein the presence server is configured to send different notifications to different subscribers to the group presentity, each notification including presence information for different subsets of the entities, and is configured to receive a policy information from a group management server which manages the group.

10. The system according to claim 9, further comprising:
a group management server configured to create the group document associated with the group and including information regarding the group's entities, and provide the group document to the presence server.

11. The system according to claim 10, wherein the group management server is further configured to periodically update the group document to reflect that any of the entities has joined or left the group and provide the updated group document to the presence server.

12. The system according to claim 9, wherein the presence server is configured to receive a publication of presence information relating to any of the entities, receive a subscription request to the group presentity, and send a notification to a subscriber indicating the published presence information of any of the entities in the group as known to the presence server.

13. The system according to claim 9, wherein the presence server is configured to remove from the group presentity any entities that leave the group, and add to the group presentity any entities that join the group.

\* \* \* \* \*